United States Patent
Forster et al.

(10) Patent No.: US 7,152,503 B2
(45) Date of Patent: Dec. 26, 2006

(54) DEVICE FOR COMPENSATING A TORQUE PRODUCED BY A GYROSTATIC EFFECT

(75) Inventors: Gerhard Forster, Schwarzenbruck (DE); Winfried Glück, Weisendorf (DE); Jens Hamann, Fürth (DE); Uwe Ladra, Erlangen (DE); Elmar Schäfers, Nürnberg (DE); Dietmar Stoiber, Fürth (DE); Hans-Peter Tröndle, Forchheim (DE); Bernd Wedel, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 209 days.

(21) Appl. No.: 10/987,948

(22) Filed: Nov. 12, 2004

(65) Prior Publication Data

US 2005/0103135 A1 May 19, 2005

(30) Foreign Application Priority Data

Nov. 13, 2003 (DE) ................ 103 53 050

(51) Int. Cl.
*F16H 37/06* (2006.01)

(52) U.S. Cl. .............. 74/665 A; 74/661; 74/665 R; 74/665 C; 74/665 P

(58) Field of Classification Search .......... 74/3, 74/5.4, 5.47, 5.7, 63, 70, 661, 665 R, 665 A, 74/665 C, 665 P
See application file for complete search history.

(56) References Cited

U.S. PATENT DOCUMENTS

| 2,140,783 | A | | 12/1938 | Bellanca |
| 4,638,221 | A | * | 1/1987 | Brignall ................ 318/48 |
| 6,658,954 | B1 | * | 12/2003 | Bosa et al. .............. 74/409 |
| 6,895,835 | B1 | * | 5/2005 | Cordeiro .............. 74/665 A |

FOREIGN PATENT DOCUMENTS

| DE | 40 24 328 A1 | 9/1991 | |
| JP | 1-193456 | * 8/1989 | ...... 74/665 A |

* cited by examiner

*Primary Examiner*—Ha Ho
(74) *Attorney, Agent, or Firm*—Henry M. Feiereisen

(57) ABSTRACT

A device for compensating a torque produced on a movable axle in a machine tool or production machine by a gyrostatic effect includes a rotating useful machine system attached to the movable axle and producing a useful angular momentum, and a rotating machine counter-system attached to the axle and producing a counter angular momentum. The magnitude of the counter angular momentum is substantially identical to the magnitude of the useful angular momentum. The useful torque produced by a movement of the rotating useful machine system through a temporal change of the useful angular momentum is at least partially compensated by a counter-torque produced by a temporal change of the counter angular momentum. This arrangement represents a simple device for compensating a torque produced by the gyrostatic effect on a movable axle of machine tolls and production machines.

8 Claims, 2 Drawing Sheets

DEVICE FOR COMPENSATING A TORQUE PRODUCED BY A GYROSTATIC EFFECT

CROSS-REFERENCES TO RELATED APPLICATIONS

This application claims the priority of German Patent Application, Serial No. 103 53 050.9, filed Nov. 13, 2003, pursuant to 35 U.S.C. 119(a)–(d).

BACKGROUND OF THE INVENTION

The present invention relates to a device for compensating a torque produced by a gyrostatic effect in a movable axle, and more particularly a device for compensating such torque in machine tools or production machines.

Nothing in the following discussion of the state of the art is to be construed as an admission of prior art.

In a machine tool or production machine, the so-called gyrostatic effect that acts on a movable axle of the machine tool or production machine frequently produces a torque that can lead to unacceptable manufacturing tolerances and can mechanically stress the machine components.

For a better understanding of the underlying gyrostatic effect and the associated problems, FIG. 1 shows schematically several exemplary components of a machine that are involved in moving a useful load 1. A motor 3 drives a useful load 1 via a rotating shaft 15 with an angular frequency $\omega_N$. The useful load 1 is in the illustrated example represented by a cylindrical workpiece that is machined with the schematically indicated tool 2. The motor 3 is connected by a fixed mechanical link with an axle 4 of the machine that has a disk-shaped upper region. The axle 4 is rotatably supported and is driven by a motor 5, which is capable of rotating the axle 4, for example, by an angle $\phi$. The motor 5 is connected by a fixed mechanical link with a carriage 6 that can move along a direction Y. The carriage 6 is movably supported on two guides 16 and driven by a motor 8. The guides 16 are connected by a fixed mechanical link with another carriage 7 which is movably supported on two guides 17 and driven by a motor 9 along an X-direction. The drive system of the carriage 7, which essentially includes the motor 9, and the drive system of the carriage 6, which essentially includes the motor 8, are only schematically shown for sake of clarity.

The useful load 1, the shaft 15 and the rotating components of the motor 3 (e.g., the rotor of the motor 3) form a so-called useful machine system that rotates with the angular frequency $\omega_N$. The rotation of the useful machine system produces a useful angular momentum vector $\vec{D}_N$ shown in FIG. 1 and oriented in the direction of the shaft 15 or the useful load 1, according to the equation (1):

$$\vec{D}_N = \vec{J}_N \cdot \omega_N \quad (1)$$

wherein $\omega_N = 2 * \pi * f$ f is the rotation frequency, and $\vec{J}_N$ is the moment of inertia of the useful machine system.

It will now be assumed that the useful load 1 is machined first with the tool 2 and thereafter with another tool 17. For this purpose, the axle 4 of the useful machine system is rotated by an angle $\phi$, while the useful machine system still rotates with the angular frequency $\omega_N$. The associated tem poral change of the useful angular momentum $\vec{D}_N$ produces a useful torque $\vec{M}_N$ according to the equation (2):

$$\vec{M}_N = \frac{d\vec{D}_N}{dt} \quad (2)$$

which applies a disturbing force F to the carriage 7 and other machine components via the axle 4. The force F should be compensated by the motor 9 and/or controlled by a position controller of the carriage 7. The useful torque $\vec{M}_N$ produced by the gyrostatic effect therefore mechanically stresses the axle 4 and other machine components, thus adversely affecting the manufacturing tolerances.

It would therefore be desirable and advantageous to provide an improved device for compensating a torque produced by the gyrostatic effect on a movable axle, in particular on a movable axle of a machine tool or production machine.

SUMMARY OF THE INVENTION

Machine tools in the context of the present invention can also include, for example, uniaxial or multi-axis lathes, milling machines, as well as drilling or grinding machines. Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

According to an aspect of the invention, a device for compensating a torque produced on a movable axle in a machine tool or production machine by a gyrostatic effect includes a rotating useful machine system attached to the movable axle and producing a useful angular momentum, and a rotating machine counter-system attached to the axle and producing a counter angular momentum. The magnitude of the counter angular momentum is substantially identical to the magnitude of the useful angular momentum. The useful torque produced by a movement of the useful machine system through a temporal change of the useful angular momentum is at least partially compensated by a counter-torque produced by a temporal change of the counter angular momentum.

According to one advantageous feature of the invention, the rotating machine counter-system can be secured to the axle in such a way that a vector orientation of the counter angular momentum opposes a vector orientation of the useful angular momentum. The useful angular momentum can therefore be easily and effectively compensated by applying a counter angular momentum that has a vector direction opposite to that of the useful angular momentum.

According to yet another advantageous feature of the invention, the useful machine system can be driven by a motor and the machine counter-system can be driven by an additional motor. By driving to the machine counter-system by an additional motor, the counter-torque can be efficiently compensated, because of the rotation speed of the machine counter-system can be precisely controlled.

According to still another advantageous feature of the invention, the additional motor can be controlled so that the magnitude of the counter angular momentum is substantially identical to the magnitude of the useful angular momentum. The counter-torque can be particularly well compensated by suitably controlling the additional motor.

Advantageously, the useful machine system can be driven by a motor and the machine counter-system can be driven by the same motor via a gear. Therefore, a gear can be used instead of a separate motor to drive the machine counter-system.

According to another advantageous feature of the invention, the rotating useful machine system and the rotating machine counter-system can be pivotally supported on the axle, whereby when the useful machine system tilts, the machine counter-system can move in the opposite direction, so that the useful torque produced by the tilting motion of the useful angular momentum can be at least partially compensated by a counter-torque produced by the tilting motion of the counter angular momentum.

According to yet another advantageous feature of the invention, the machine counter-system can have a smaller moment of inertia than the useful machine system. The machine counter-system can then have a proportionally greater rotation speed, so that the magnitude of the counter angular momentum can be substantially identical to the magnitude of the useful angular momentum. A machine counter-system with a very small moment of inertia can be constructed so as to require only a small installation space.

According to still another advantageous feature of the invention, the useful torque and/or the moment of inertia of the useful machine system can be measured for controlling the rotation speed of the machine counter-system. The rotation speed of the machine counter-system can then be controlled, so that the magnitude of the counter angular momentum is at least partially identical to the magnitude of the useful angular momentum, thereby optimally compensating the useful torque.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
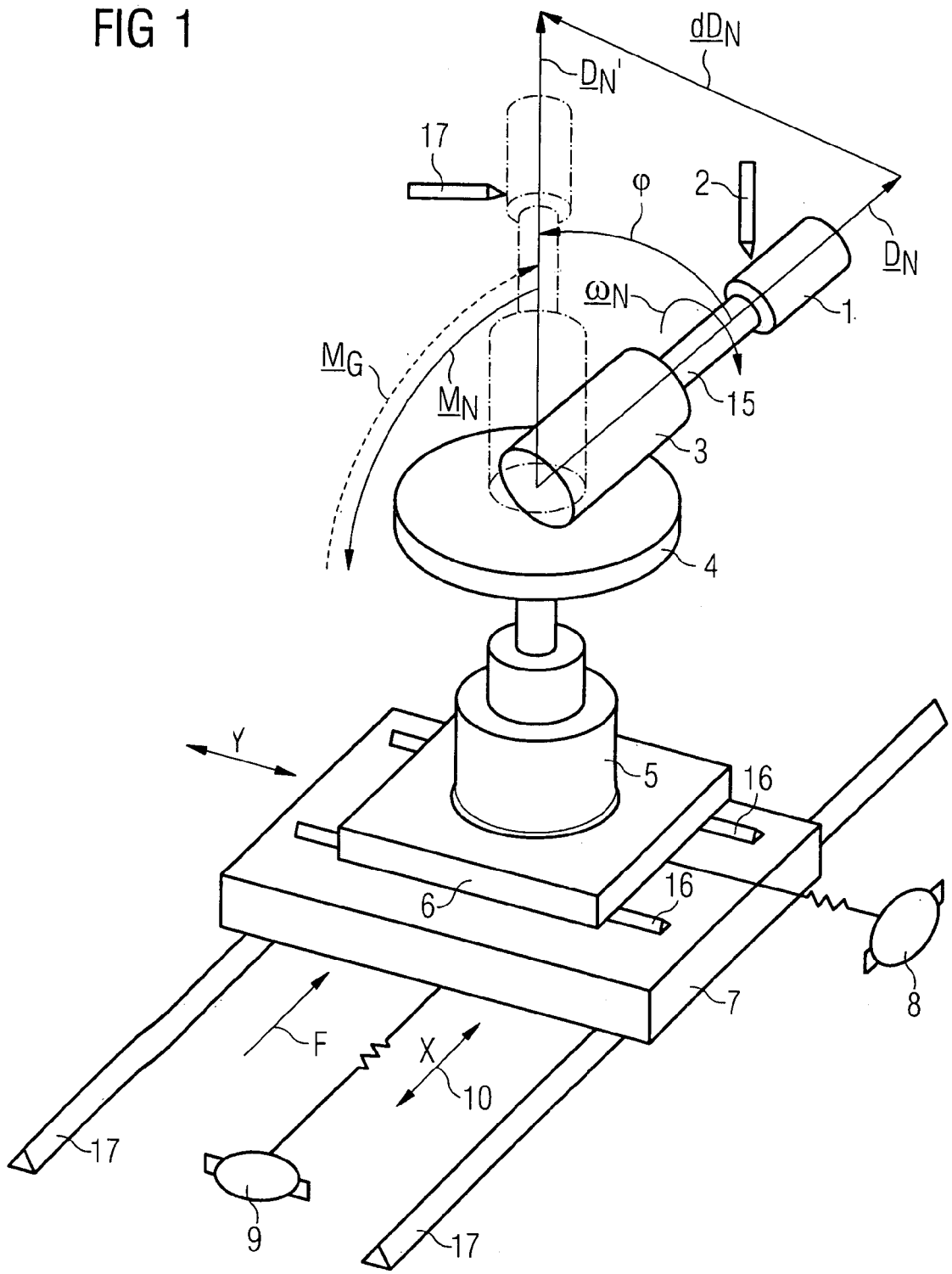
FIG. 1 shows a schematic diagram of a machine system with a useful load secured to an axle driven by a motor and a torque produced by a change in angular momentum.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The problems associated with gyrostatic effect and the corresponding components have already been described above with reference to FIG. 1. According to the invention, the useful torque $\vec{M}_N$ that is produced by the useful machine system as a result of the temporal change of the useful angular momentum $\vec{D}_N$, is compensated by a counter-torque $\vec{M}_G$ produced by an additional machine counter-system, which produces a counter-torque, as indicated by dotted lines in FIG. 1. The machine counter-system has been omitted from FIG. 1 for sake of clarity.

Figure 2:
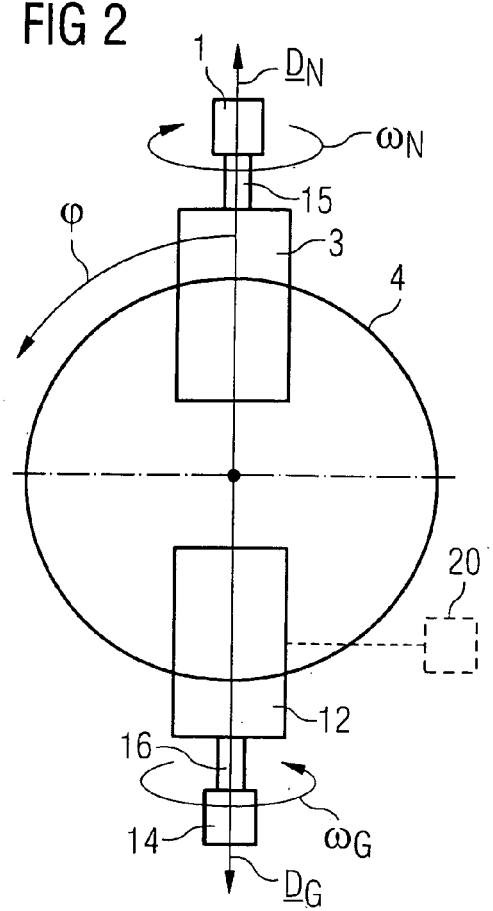
FIG. 2 shows a first embodiment of the torque compensation system of the invention using two motors for applying a counter-torque.

Turning now to FIG. 2, in a first embodiment of the invention, a motor 3 drives via a rotating shaft 15 a load 1 that is fixedly secured to the axle 4 that rotates with an angular frequency $\omega_N$. The rotating load 1, the shaft 15 and the rotating components of the motor 3 (e.g., the rotor of the motor 3) form, as in FIG. 1, a rotating useful machine system that has a useful angular momentum $\vec{D}_N$ in the direction of the axle 15 and the load 1, respectively. A rotation of the axle 4 by an angle $\phi$ produces a useful torque $\vec{M}_N$ as a result of the temporal change of the useful angular momentum $\vec{D}_N$. According to the invention, the useful torque $\vec{M}_N$ is compensated by a counter-torque $\vec{M}_G$ produced by the machine counter-system. The machine counter-system includes the rotating components of a second motor 12, which is offset with respect to the axle 4 by 180°, a rotating shaft 16 driven by the second motor 12 and a compensating load 14. The rotating machine counter-system rotates in the same rotation direction as the useful machine system, but the counter angular momentum $\vec{D}_G$ is oriented in a direction opposite to that of the useful angular momentum $\vec{D}_N$, because the machine counter-system is offset with respect to the axle 4 by approximately 180°. It should be noted that the useful angular momentum $\vec{D}_N$, the counter angular momentum $\vec{D}_G$, the moment of inertia of the useful machine system $\vec{J}_N$, and the moment in inertia of the machine counter-system $\vec{J}_G$ are expressed as vectors. The machine counter-system rotates with an angular frequency $\omega_G$ which is controlled by a controller 20 indicated schematically in FIG. 2 by a dotted line. The magnitude of the counter angular momentum $\vec{D}_G$ is equal to the magnitude of the useful angular momentum $\vec{D}_N$, i.e., $$|\vec{J}_N \cdot \omega_N| = |\vec{J}_G \cdot \omega_G| \quad (3)$$

with $$|\vec{D}_N| = |\vec{J}_N \cdot \omega_N|$$

$$|\vec{D}_G| = |\vec{J}_G \cdot \omega_G|$$

The useful angular momentum $\vec{D}_N$ and the counter angular momentum $\vec{D}_G$, and the useful torque $\vec{M}_N$ and the counter-torque $\vec{M}_G$ then compensate each other so that ideally the useful torque $\vec{M}_N$ can be almost completely compensated.

Figure 3:
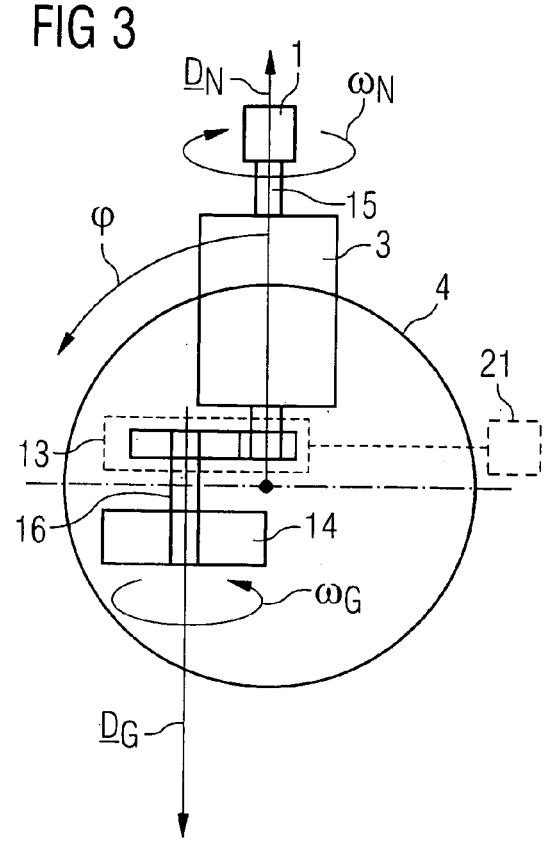
FIG. 3 shows a second embodiment of the torque compensation system of the invention using a single motor and a gear for applying the counter-torque.

FIG. 3 shows another embodiment of the invention, with the components in FIG. 3 having the same reference numerals as the components in FIG. 2. The compensation mechanism of FIG. 3 for compensating the useful torque $\vec{M}_N$ is in principle arranged and operated in the same manner as in the compensation mechanism of FIG. 2. However, unlike the machine counter-system of FIG. 2, the machine counter-system of FIG. 3 is formed essentially by a rotating load 14 and by a rotating shaft 16 that drives the load 14, i.e. without the motor 12. The machine counter-system is driven via a gear 13 by the same motor 3 as the useful machine system. A portion of the rotating mass of the gear that rotates with the angular frequency $\omega_G$ of the machine counter-system can be associated with the machine counter-system, whereas another portion of the rotating mass of the gear that rotate with the angular frequency $\omega_N$ of the useful machine system, can be associated with the useful machine system. The gear ratio of the gear 13 is selected so as to satisfy equation (3). In the embodiment of FIG. 3, unlike in the embodiment of FIG. 2, the gear ratio of gear 13 may disadvantageously not be continuously adjustable by a controller 21 (only indicated schematically in FIG. 3 by dotted lines), so that the useful angular momentum $\vec{D}_N$ or the useful torque $\vec{M}_N$ may therefore not fully compensated. The gear ratio of gear 13 can, of course, be adjustable, but may be fixed to simplify the implementation. However, the embodiment of FIG. 3 advantageously does not require a separate motor that drives the machine counter-system.

Figure 4:
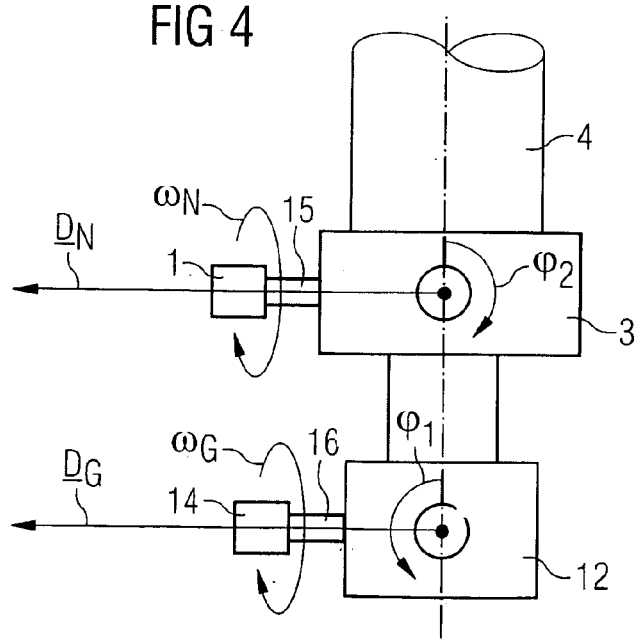
FIG. 4 shows a third embodiment of the torque compensation system of the invention, wherein the counter-torque is adjusted by tilting the machine counter-system.

FIG. 4 shows another embodiment of the invention. A rotating useful machine system and a rotating machine counter-system are pivotally supported on axle 4. The useful machine system is hereby formed by a useful load 1, a shaft 15 and a rotating component of a motor 3. The machine counter-system is formed by a counter load 14, a shaft 16 and the rotating components of a drive motor 12. If the useful machine system is tilted, for example by an angle $\phi_2$, then the resulting useful torque $\vec{M}_N$ can be compensated by rotating the machine counter-system in the opposite direction by an angle $\phi_1$, wherein $$|\vec{J}_N \cdot \omega_N| = |\vec{J}_G \cdot \omega_G| \qquad (4a)$$

$$\phi_1 = \phi_2 \qquad (4b)$$

The machine counter-system is tilted so that the useful torque $\vec{M}_N$ produced by the tilting motion of the useful angular momentum $\vec{D}_N$ is compensated by a counter-torque $\vec{M}_G$ produced by the tilting motion of the counter angular momentum $\vec{D}_G$. The machine counter-system can be tilted by a separate drive that operates independently of the drive that tilts the useful machine system, or the tilting motion of the machine counter-system can be suitably coupled via a gear with the tilting motion of the useful machine system.

It should be noted here that it is quite difficult in practical situations to completely compensate the useful angular momentum $\vec{D}_N$, since the moment of inertia of the load 1 of the useful machine system can vary and is frequently not exactly known.

In such cases, the useful angular momentum $\vec{D}_N$ and the useful torque $\vec{M}_N$, respectively, can be at least partially compensated by the corresponding counter angular momentum $\vec{D}_G$ and the counter-torque $\vec{M}_G$ by estimating the moment of inertia of the load 1 and/or the moment of inertia $\vec{J}_N$ of the useful machine system. Accordingly, the actual situation can also be significantly improved for these situations.

Alternatively, the counter-torque $\vec{M}_G$ and/or the moment of inertia $\vec{J}_N$ of the useful machine system can be measured so as to control the rotation speed, i.e., the angular frequency $\omega_G$, of the machine counter-system, so that the magnitude of the counter angular momentum becomes substantially identical to the magnitude of the useful angular momentum. This measurement can be performed, for example, by using suitable sensor electronics and/or by measuring, for example, the energy required to accelerate the useful load 1 or to accelerate the useful machine system.

The moment of inertia $\vec{J}_G$ of the machine counter-system can be kept small to minimize the required installation size. In this case, the rotation speed, i.e., the angular frequency $\omega_G$ of the counter-system, can be increased proportionally to again make the magnitude of the counter angular momentum identical to the magnitude of the useful angular momentum.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A device for compensating a working torque produced on a movable axle in a machine tool or production machine by a gyrostatic effect, comprising:
    a rotating working machine system attached to the movable axle and producing a working angular momentum,
    a rotating machine counter-system attached to the axle and producing a counter angular momentum, with a magnitude of the counter angular momentum being substantially identical to a magnitude of the working angular momentum,
    wherein the working torque produced by a movement of the working machine system through a temporal change of the working angular momentum is at least partially compensated by a counter-torque produced by a temporal change of the counter angular momentum.

2. The device of claim 1, wherein the rotating machine counter-system is attached to the axle in such a way that a vector orientation of the counter angular momentum opposes a vector orientation of the working angular momentum.

3. The device of claim 2, wherein the rotating working machine system is driven by a motor and the rotating machine counter-system is driven by an additional motor.

4. The device of claim 3, wherein the additional motor is controlled so that the magnitude of the counter angular momentum is substantially identical to the magnitude of the working angular momentum.

5. The device of claim 2, wherein the rotating working machine system is driven by a motor and the rotating machine counter-system is driven by the same motor via a gear.

6. The device of claim 1, wherein the rotating working machine system and the rotating machine counter-system are pivotally supported on the axle, whereby when the rotating working machine system tilts, the rotating machine counter-system moves in the opposite direction, so that the working torque produced by the tilting motion of the working angular momentum is at least partially compensated by a counter-torque produced by the tilting motion of the counter angular momentum.

7. The device of claim 1, wherein the rotating machine counter-system has a smaller moment of inertia than the rotating working machine system, wherein the rotating machine counter-system has a proportionally greater rotation speed, so that a magnitude of the counter angular momentum is substantially identical to a magnitude of the working angular momentum.

8. The device of claim 1, wherein the working torque or the moment of inertia of the rotating working machine system, or both, are measured, and the rotation speed of the rotating machine counter-system is controlled, so that a magnitude of the counter angular momentum is substantially identical to a magnitude of the working angular momentum.

* * * * *